(12) United States Patent
Jiang et al.

(10) Patent No.: US 8,957,643 B2
(45) Date of Patent: Feb. 17, 2015

(54) METHOD AND DEVICE FOR MAXIMUM POWER POINT TRACKING OF PHOTOVOLTAIC MODULE SYSTEMS

(71) Applicant: National Taiwan University, Taipei (TW)

(72) Inventors: Joe Air Jiang, Taipei (TW); Jen Cheng Wang, New Taipei (TW); Yu Li Su, New Taipei (TW); Kun-Chang Kuo, Taipei (TW); Jyh-Cherng Shieh, Taipei (TW)

(73) Assignee: National Taiwan University, Taipei (TW)

( * ) Notice: Subject to any disclaimer, the term of this patent is extended or adjusted under 35 U.S.C. 154(b) by 208 days.

(21) Appl. No.: 13/846,312

(22) Filed: Mar. 18, 2013

(65) Prior Publication Data
US 2014/0077785 A1 Mar. 20, 2014

(30) Foreign Application Priority Data
Sep. 18, 2012 (TW) .............................. 101134192 A

(51) Int. Cl.
*G05F 5/00* (2006.01)
*G05F 1/67* (2006.01)

(52) U.S. Cl.
CPC ... *G05F 5/00* (2013.01); *G05F 1/67* (2013.01)
USPC ........................................................ 323/234

(58) Field of Classification Search
CPC ............ G05F 1/67; G05F 5/00; H02M 3/156
USPC ..................... 323/234, 299; 327/57
See application file for complete search history.

(56) References Cited

U.S. PATENT DOCUMENTS

| 8,704,499 B2* | 4/2014 | Escobar et al. ................ 323/222 |
| 2009/0115393 A1* | 5/2009 | Yoshida et al. ................ 323/300 |
| 2012/0016529 A1 | 1/2012 | Jiang et al. |
| 2013/0063117 A1* | 3/2013 | Lee ................................ 323/299 |

FOREIGN PATENT DOCUMENTS

| TW | 201003099 A | 1/2010 |
| TW | 201100995 A1 | 1/2011 |
| TW | 201202887 A1 | 1/2012 |

* cited by examiner

*Primary Examiner* — Adolf Berhane
*Assistant Examiner* — Yemane Mehari
(74) *Attorney, Agent, or Firm* — Huffman Law Group, PC

(57) ABSTRACT

A method of maximum power point tracking for a photovoltaic module system is disclosed. The photovoltaic module system may comprise a photovoltaic module array comprising a plurality of identical photovoltaic modules, and the tracking method may comprise: detecting system parameters and environmental parameters of the photovoltaic module array; estimating a first voltage coefficient of one photovoltaic module according to the system parameters and the environmental parameters; estimating a plurality of second voltage coefficients of the photovoltaic module array according to the first voltage coefficient with different shading ratios; estimating a plurality of local maximum power point powers according to corresponding second voltage coefficients; and determining a whole maximum power point by comparing the local maximum power point powers with one another.

24 Claims, 5 Drawing Sheets

METHOD AND DEVICE FOR MAXIMUM POWER POINT TRACKING OF PHOTOVOLTAIC MODULE SYSTEMS

CROSS-REFERENCE TO RELATED APPLICATION(S)

This application claims priority to Taiwan Patent Application No. 101134192, filed on Sep. 18, 2012, the disclosure of which is hereby incorporated by reference in its entirety.

BACKGROUND OF THE DISCLOSURE

1. Field of the Invention

The present disclosure relates to a method of maximum power point tracking for a photovoltaic module system. More particularly, the present disclosure relates to a method of maximum power point prediction for a photovoltaic module system.

2. Description of the Related Art

Due to shortages and negative environment impacts of conventional fuels, renewable energy sources such as solar energy, wind energy, and fuel cell energy are gaining more attention. Solar energy in particular is especially attractive as an alternative energy source. With traditional photovolatic modules, the voltage coefficient and the current coefficient may be experimental values, which may change with changes in the environmental temperature and irradiation intensity. As a result, the maximum power point power may also change with changes in the environmental temperature and irradiation intensity. Accordingly, there is a need for a rapid and precise method of tracking actual maximum power point.

SUMMARY OF THE DISCLOSURE

The present disclosure relates to a method and device for tracking the maximum power point of a photovoltaic module system and/or a photovoltaic module array.

In some embodiments, a method of tracking the maximum power point of a photovoltaic module system is provided. The photovoltaic module system may comprise a photovoltaic module array comprising a plurality of identical photovoltaic modules. The tracking method may comprise: detecting system parameters and environmental parameters of the photovoltaic module array; estimating a first voltage coefficient of one photovoltaic module according to the system parameters and the environmental parameters; estimating a plurality of second voltage coefficients of the photovoltaic module array according to the first voltage coefficient with different shading ratios; estimating a plurality of local maximum power point powers according to corresponding second voltage coefficients; and determining a whole maximum power point by comparing the local maximum power point powers with one another.

In some embodiments, a control device for predicting the maximum power point of a photovoltaic module array is provided. The photovoltaic module array may comprise a plurality of identical photovoltaic modules. The control device may be connected between the photovoltaic module array and a power converter. The control device may comprise: a parameter detecting unit connected to the photovoltaic module array and configured to detect system parameters and environmental parameters of the photovoltaic module array; and a micro control unit connected between the parameter detecting unit and the power converter, and configured to estimate a first voltage coefficient of one photovoltaic module according to the system parameters and the environmental parameters, a plurality of second voltage coefficients of the photovoltaic module array according to the first voltage coefficient with different shading ratios, a plurality of local maximum power point powers according to corresponding second voltage coefficients; and determine a whole maximum power to point by comparing the local maximum power point powers with one another.

Overall, the method of tracking the maximum power point and the control unit of the photovoltaic module array may estimate the second voltage coefficients of the photovoltaic module array according to the first voltage coefficient of one photovoltaic module. Further, the method and device may estimate the local maximum power point powers according to the second voltage coefficients and determine the whole maximum power point of the photovoltaic module array according to the maximum of the local maximum power point powers, such that the whole maximum power point of the photovoltaic module array may be obtained rapidly and exactly.

The foregoing is a summary and shall not be construed to limit the scope of the claims. The operations and devices disclosed herein may be implemented in a number of ways, and such changes and modifications may be made without departing from this disclosure and its broader aspects. Other aspects, inventive features, and advantages of the disclosure, as defined solely by the claims, are described in the non-limiting detailed description set forth below.

DETAILED DESCRIPTION OF EMBODIMENTS

Figure 1A:
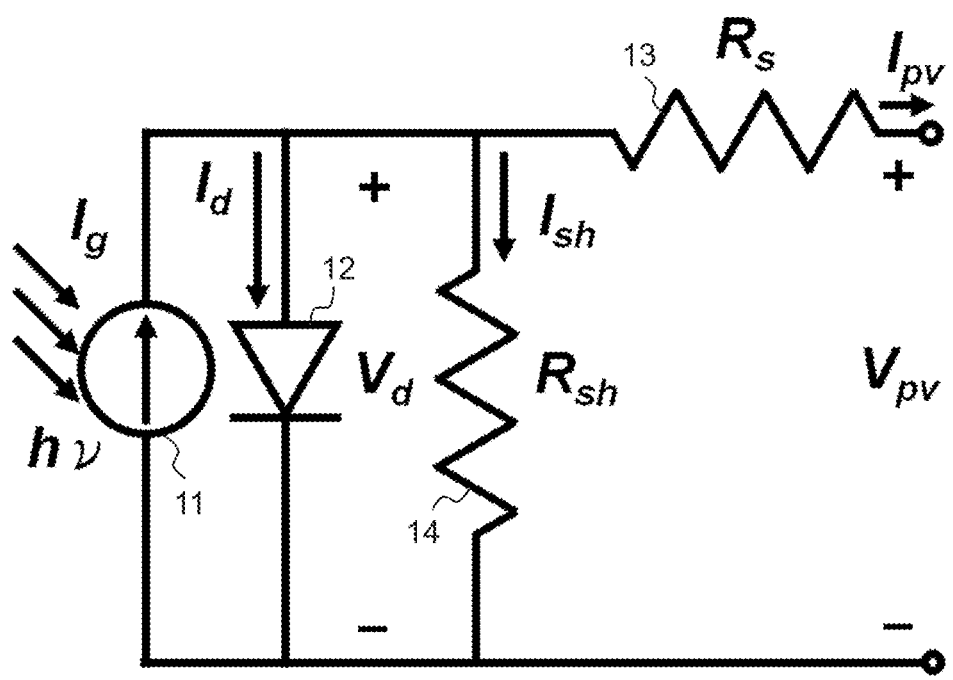
FIG. 1A illustrates an equivalent circuit diagram illustrating a traditional photovoltaic module of a photovoltaic module system.

Reference will be made in detail to the present embodiments, examples of which are illustrated in the accompanying drawings. Wherever possible, the same reference numbers are used in the drawings and the description to refer to the same or like parts.

Figure 1B:
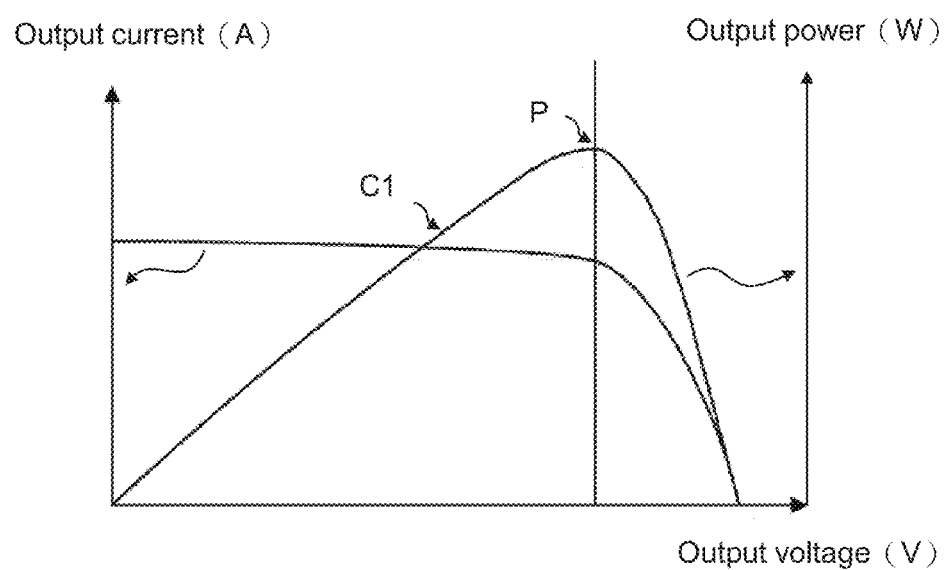
FIG. 1B illustrates the output voltage-current and output voltage-power characteristic curves of a traditional photovoltaic module of a photovoltaic module system.

FIG. 1A depicts a traditional photovoltaic module of a photovoltaic module system. FIG. 1B depicts output voltage-current and output voltage-power characteristic curves of the traditional photovoltaic module of the photovoltaic module system. The traditional photovoltaic module 10 may include a photocurrent source 11, a diode 12, a series resistor 13, and a parallel resistor 14. Referring to FIG. 1A, $I_g$ denotes a photocurrent generated from the photovoltaic module 10 radiated by light with energy hv. $I_{pv}$ denotes an output current of the photovoltaic module 10. $V_{pv}$ denotes an output voltage of the photovoltaic module 10. $R_s$ denotes a series resistance of the series resistor 13, which is determined by a manufacture technique of the photovoltaic module 10 and obtained from the specification of the photovoltaic module 10 provided from the manufacturer. $R_{sh}$ denotes a parallel resistance of the parallel resistor 14. $I_d$ denotes a diode current passing through the diode 12. $I_{sh}$ denotes a parallel current passing through the parallel resistor 14. $V_d$ denotes a diode voltage of the diode 12.

One of ordinary skill in the art having the benefit of the present disclosure would appreciate that Kirchhoffs Current Law and Kirchhoff's Voltage Law may be applied to a photovoltaic module system. According to Kirchhoff's Current Law and Kirchhoff's Voltage Law, the output current $I_{pv}$ and the output voltage $V_{pv}$ may be expressed by the Equations (1) and (2) as follows:

$$I_{pv} = I_g - I_d - I_{sh} = I_g - I_d - \frac{V_d}{R_{sh}} \quad (1)$$

$$V_d = V_{pv} + R_s I_{pv} \quad (2)$$

Additionally, according to the PN character of the diode 12, the diode current $I_d$ and the diode voltage $V_d$ may be expressed by the Equation (3) as follows:

$$I_d = I_{sat}\left\{\exp\left[\frac{qV_d}{nkT}\right] - 1\right\} \quad (3)$$

In Equation (3), $I_{sat}$ denotes a reverse saturation current of the diode 12, q denotes the electron charge ($1.602*10^{-19}$ C), n denotes the ideality factor of the diode 12, (approximately between 1 and 2), k denotes the Boltzmann's constant ($JK^{-1}$), and T denotes the ambient temperature (K). Equations (1), (2), (3) may be combined to obtain the Equation (4) for the output current $I_{pv}$:

$$I_{pv} = I_g - I_{sat}\left\{\exp\left[\frac{q(V_{pv} + R_s I_{pv})}{nkT}\right] - 1\right\} - \frac{V_{pv} + R_s I_{pv}}{R_{sh}} \quad (4)$$

One of ordinary skill in the art having the benefit of the present to disclosure would appreciate that, in practice, the parallel resistance $R_{sh}$ is very large. Accordingly, Equation (4) may be further simplified as follows:

$$I_{pv} = I_g - I_{sat}\left\{\exp\left[\frac{q(V_{pv} + R_s I_{pv})}{nkT}\right] - 1\right\} \quad (5)$$

Since the output power $P_{pv}$ of the photovoltaic module 10 satisfies $P_{pv} = V_{pv} \times I_{pv}$, the output power $P_{pv}$ may be obtained by the output current $I_{pv}$ and the output voltage $V_{pv}$. As shown in FIG. 1B, the maximum power point P is the point located on the curve C1 of the output power $P_{pv}$ where the tangent slope is zero. The tangent slope may be defined as $$\beta = \frac{dP_{pv}}{dV_{pv}} = I_{pv} + \frac{dI_{pv}}{dV_{pv}} \times V_{pv}.$$

Accordingly, the tangent slope $\beta$ may be obtained from Equation (5) as follows:

$$\beta = I_g - I_{sat}\left\{\exp\left[\frac{q(V_{pv} + R_s I_{pv})}{nkT}\right] - 1\right\} - \frac{qI_{sat}}{nkT}\exp\left[\frac{q(V_{pv} + R_s I_{pv})}{nkT}\right]\left(1 + \frac{dI_{pv}}{dV_{pv}} \times R_s\right)V_{pv} \quad (6)$$

One of ordinary skill in the art having the benefit of the present disclosure would appreciate that, to estimate a maximum power point power $P_{max}$, $\beta$ may be set to be zero. Accordingly, Equation (6) may be further simplified as follows:

$$\frac{I_g + I_{sat}}{I_{sat}} = \exp\left[\frac{q(V_{mp} + R_s I_{mp})}{nkT}\right]\left(1 + \frac{qV_{mp}}{nkT} + \frac{qV_{mp}R_s}{nkT}\frac{dI_{pv}}{dV_{pv}}\bigg|_{V_{pv}=V_{mp}}\right) \quad (7)$$

In Equation (7), $V_{mp}$ denotes an estimated voltage at the maximum power point P. $I_{mp}$ denotes an estimated current at the maximum power point P.

One of ordinary skill in the art having the benefit of the present disclosure would appreciate that when the photovoltaic module 10 operates in an open-circuit condition, i.e. the output current $I_{pv}$ satisfies $I_{pv}=0$ Equation (8) may be obtained from Equation (5) as follows:

$$\frac{I_g + I_{sat}}{I_{sat}} = \exp\left[\frac{qV_{oc}}{nkT}\right] \quad (8)$$

Generally, the photovoltaic module 10 may include an open-circuit voltage $V_{oc}$ and a short-circuit current $I_{sc}$, which may be measured under a predetermined temperature and irradiation intensity. Equations (7) and (8) may be combined to reach Equation (9) for the relationship between $V_{mp}$ and $V_{oc}$:

$$\left(1 + \frac{qV_{mp}}{nkT} + \frac{qV_{mp}R_s}{nkT}\frac{dI_{pv}}{dV_{pv}}\bigg|_{V_{pv}=V_{mp}}\right) = \exp\left[\frac{q(V_{oc} - R_s I_{mp} - V_{mp})}{nkT}\right] \quad (9)$$

When the photovoltaic module 10 is coupled with an direct current to alternating current inverter, the output power of the photovoltaic module 10 may be transferred into an alternating current power by the direct current to alternating current inverter. The effective line power $P_s$ of the alternating current power may be obtained based on the Equation (10):

$$P = V_s \times I_s \times \cos\theta = V_s \times I_T \quad (10)$$

Referring to Equation (10), $V_s$ denotes a root-mean-square (rms) value of the line voltage. $I_s$ denotes a root-mean-square (rms) value of the line current. $\theta$ denotes the angle between the line voltage vector and the line current vector. $I_T$ denotes the line current.

In another aspect, the output power $P_{pv}$ of the photovoltaic module 10 may be a direct current output power. One of ordinary skill in the art having the benefit of the present disclosure would appreciate that, according to the law of conservation of energy, some energy may dissipate as heat during power conservation. Therefore, the output power $P_{pv}$ and the effective line power $P_s$ may satisfy Equations (11) and (12) through a conservation efficiency $\eta$ as follows:

$$\eta P_{pv} = P_s \quad (11)$$

$$\eta V_{pv} \times I_{pv} = V_s \times I_T \quad (12)$$

Accordingly, the output current $I_{pv}$ of the photovoltaic module 10 satisfies Equation (13) as follows:

$$I_{pv} = \frac{V_s \times I_T}{\eta V_{pv}} \qquad (13)$$

Therefore, the estimated current $I_{mp}$ may be obtained from Equation (13) through the estimated voltage $V_{mp}$, i.e., $$I_{mp} = I_{pv}|_{V_{pv}=V_{mp}} = \frac{V_s \times I_T}{\eta V_{mp}}.$$

Further, since $$\left.\frac{dI_{pv}}{dV_{pv}}\right|_{V_{pv}=V_{mp}} = -\frac{V_s \times I_T}{\eta V_{mp}^2},$$

Equation (9) may be transformed into Equation (14) as follows:

$$1 + \frac{qV_{mp}}{nkT} - \frac{q}{nkT}\left(\frac{V_s \times I_T}{\eta V_{mp}}\right)R_s = \exp\left[\frac{q}{nkT}\left(V_{oc} - R_s\frac{V_s \times I_T}{\eta V_{mp}} - V_{mp}\right)\right] \qquad (14)$$

In Equation (14), except for the estimated voltage $V_{mp}$ and the open-circuit voltage $V_{oc}$, each parameter may be obtained through measurements or through specifications provided by the manufacturer. In order to obtain the estimated voltage $V_{mp}$, it may be assumed that the estimated voltage $V_{mp}$ is expressed as being proportional to the open-circuit voltage $V_{oc}$, i.e. $V_{mp}=m_{Vk}V_{oc}$. In the expression, $m_{Vk}$ denotes a voltage coefficient of one photovoltaic module under no shading condition. It may be assumed that the estimated current $I_{mp}$ is expressed as proportional to the short-circuit voltage $I_{sc}$, i.e. $I_{mp}=m_{Ik}I_{sc}$, in which $m_{Ik}$ denotes a current coefficient. Therefore, Equation (14) may be further simplified based on $V_{mp}=m_{Vk}V_{oc}$ as follows:

$$1 + \frac{qm_{Vk}V_{oc}}{nkT} - \frac{q}{nkT}\left(\frac{V_s \times I_T}{\eta m_{Vk}V_{oc}}\right)R_s = \exp\left[\frac{q}{nkT}\left(V_{oc} - R_s\frac{V_s \times I_T}{\eta m_{Vk}V_{oc}} - m_{Vk}V_{oc}\right)\right] \qquad (15)$$

Accordingly, the voltage coefficient $m_{Vk}$ may be calculated from Equation (15), and the estimated voltage $V_{mp}$ of the maximum output power of an ideal photovoltaic cell may be estimated from the open-circuit voltage $V_{oc}$ and the voltage coefficient $m_{Vk}$. Further, the estimated current $I_{mp}$ may be calculated from Equation (13) through the estimated voltage $V_{mp}$. The maximum power point power $P_{max}$ and the current coefficient $m_{Ik}$ may be estimated.

However, the voltage coefficient $m_{Vk}$ and the current coefficient $m_{Ik}$ are experimental values, which may change with changes in the environmental temperature and irradiation intensity. As a result, the maximum power point power $P_{max}$ may also change with changes in the environmental temperature and irradiation intensity. Therefore, the power tracking method mentioned above may be improved by a perturbation and observation (P&O) method for adjusting the voltage coefficient $m_{Vk}$ and the current coefficient $m_{Ik}$. However, the traditional perturbation and observation (P&O) method may disturb around the maximum power point and result in damage of energy and decrease in conversion efficiency of the photovoltaic module.

As one of ordinary skill in the art having the benefit of the present disclosure would appreciate, the characteristics and performance of a photovoltaic module may be affected by environmental parameters such as temperature, non-uniformity of irradiation intensity, and solar shading. Solar shading may be caused by fallen leaves and dust. Changes in the irradiation intensity may affect the output current of the photovoltaic module. Similarly, changes in the temperature may affect the output voltage of the photovoltaic module. As one of ordinary skill in the art having the benefit of the present disclosure would appreciate, when the irradiation intensity decreases and the environmental temperature increases, the power of the photovoltaic module may decrease.

Figure 2A:
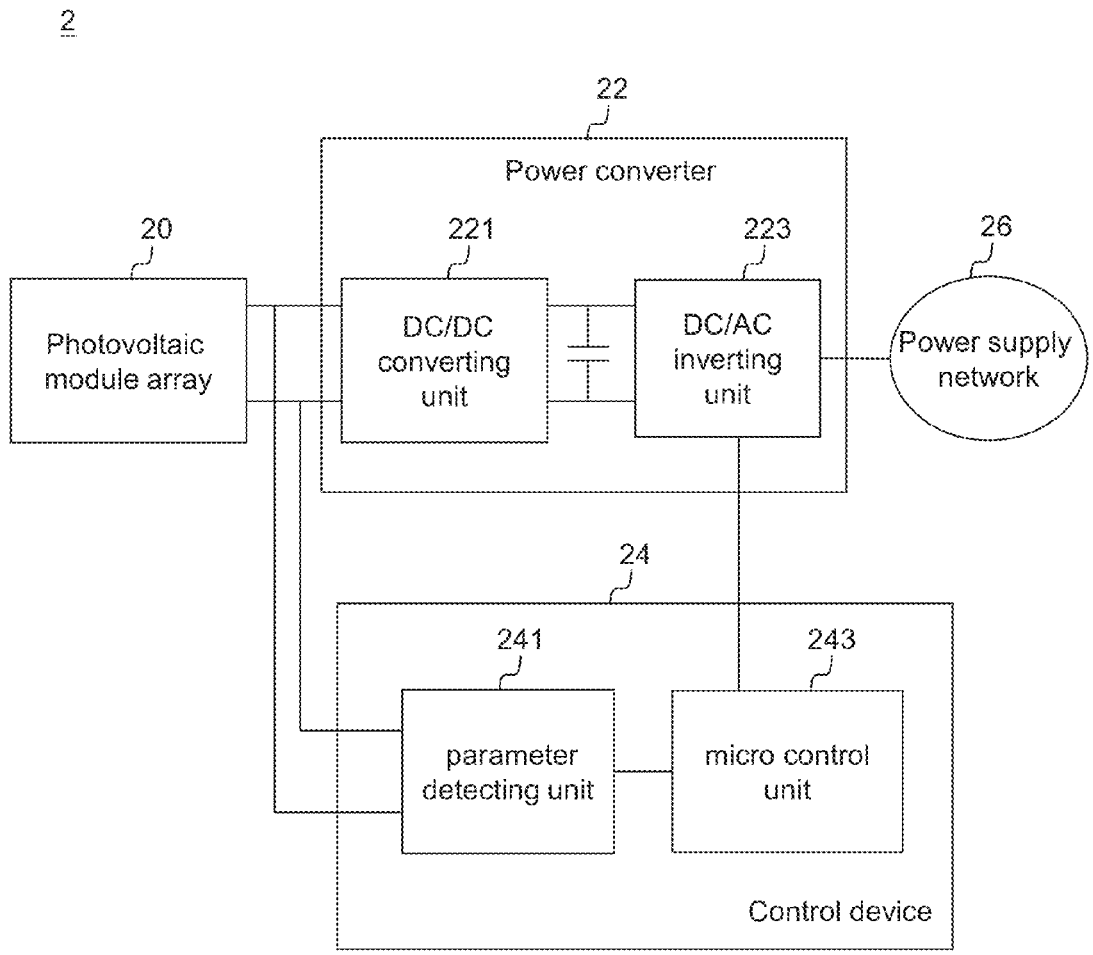
FIG. 2A is a block diagram illustrating a photovoltaic module in accordance with one embodiment of the present disclosure.

FIG. 2A is a block diagram illustrating a photovoltaic module in accordance with one embodiment of the present disclosure. As shown in FIG. 2A, a photovoltaic module system 2 may include a photovoltaic module array 20, a power converter 22, a control device 24, and a power supply network 26. The power converter 22 may be electrically connected between the photovoltaic module array 20 and the power supply network 26. The control device 24 may be electrically connected between the power converter 22 and the photovoltaic module array 20.

In some embodiments, the photovoltaic module array 20 may include a plurality of photovoltaic modules as shown in FIG. 1A, in which the photovoltaic modules are identical and connected in series or parallel. The power converter 22 may include a direct current to direct current converting unit (DC/DC converting unit) 221 and a direct current to alternating current inverting unit (DC/AC inverting unit) 223, in which the DC/DC converting unit 221 is electrically connected between the photovoltaic module array 20 and the DC/AC inverting unit 223, and the DC/AC inverting unit 232 is electrically connected to the power supply network 26. The control device 24 may include a parameter detecting unit 241 and a micro control unit 243, in which the parameter detecting unit 241 may be electrically connected between the photovoltaic module array 20 and the micro control unit 243, and the micro control unit 243 may be electrically connected to the DC/AC inverting unit 223.

Figure 2B:
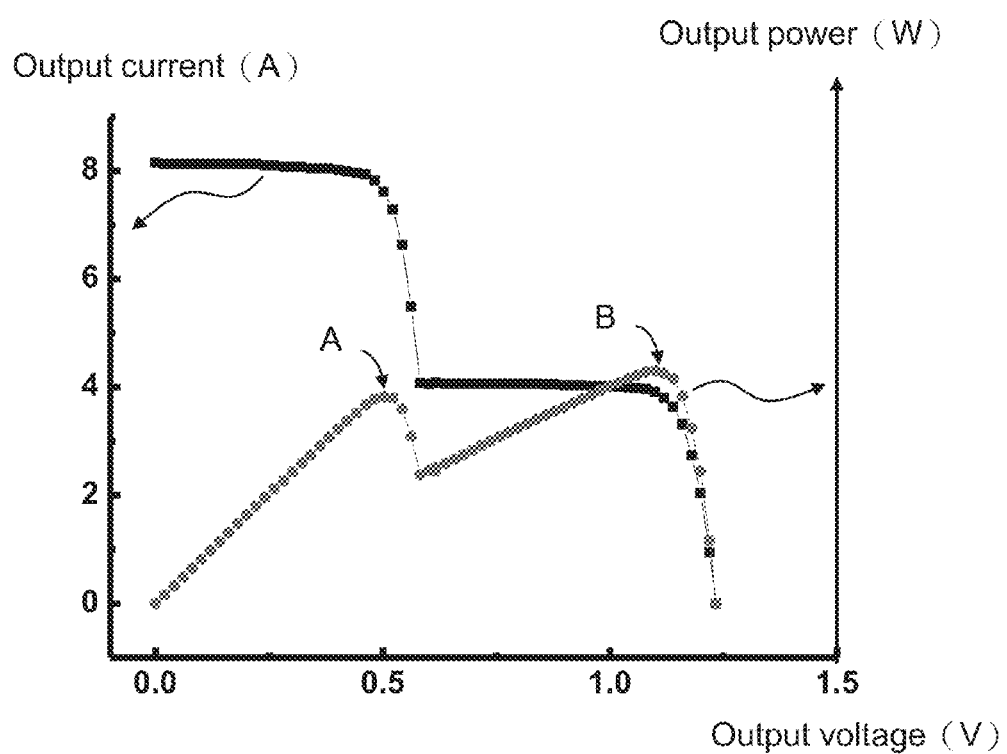
FIG. 2B illustrates the output voltage-current and output voltage-power characteristic curves of a photovoltaic module in accordance with one embodiment of the present disclosure.

FIG. 2B illustrates the output voltage-current and output voltage-power characteristic curves when the photovoltaic module array 20 is under partially shaded conditions. As shown in FIG. 2B, the output voltage-power characteristic curve has multiple local maximum power points (MPPs) such as a first local maximum power point A and a second local maximum power point B. According to some embodiments of the present disclosure, the method of maximum power point tracking of the photovoltaic module system 2 uses the method of maximum power point tracking of one photovoltaic module and assumes that a plurality of photovoltaic modules of the photovoltaic module array 20 are under partially shaded conditions. The first local maximum power point A and the second local maximum power point B may be obtained by estimating the maximum power point power tracking of one photovoltaic module under no shaded condition, particularly according to the shaded degree of each local maximum power point.

The photovoltaic module array 20 may include a plurality of photovoltaic modules connected in series to one another. System parameters and environmental parameters may be detected by the parameter detecting unit 241. The system parameters may include, for example but not limited to, the number of the photovoltaic modules N, an open-circuit voltage $V'_{oc}$ of the photovoltaic module array 20, a conservation efficiency $\eta'$, an effective line power $P'_s$, and a series resistance $R'_s$. The environmental parameters may include, for example, but not limited to, an environmental temperature T, an illustration intensity W, and number of the shading $n_{shade}$. Since the photovoltaic modules of the photovoltaic module array 20 may be identical, the micro control unit 243 may obtain parameters of one photovoltaic module by dividing the open-circuit voltage $V'_{oc}$, the conservation efficiency $\eta'$, the effective line power $P'_s$, and the series resistance $R'_s$ with the number of the photovoltaic modules N to be an open-circuit voltage $V_{oc}$, a conservation efficiency $\eta$, an effective line power $P_s$, and a series resistance $R_s$.

The micro control unit 243 may estimate a voltage coefficient $m_{Vk}$ (first voltage coefficient) and a current coefficient $m_{Ik}$ (first current coefficient) of one photovoltaic module of the photovoltaic module array 20 by entering the above-mentioned parameters of one photovoltaic module thereof into Equation (15) as follows:

$$1 + \frac{qm_{Vk}V_{oc}}{nkT} - \frac{q}{nkT}\left(\frac{V_s \times I_T}{\eta m_{Vk} V_{oc}}\right) R_s = \exp\left[\frac{q}{nkT}\left(V_{oc} - R_s \frac{V_s \times I_T}{\eta m_{Vk} V_{oc}} - m_{Vk} V_{oc}\right)\right] \quad (15)$$

In some embodiments, it is assumed that a voltage coefficient $m_{mp}$ of a maximum power point of the photovoltaic module array 20 may be one of a plurality of voltage coefficients $m'_{Vk}$ of several local maximum power points, which may be expressed by relation (a) as follows:

$$m_{mp} \in \{m'_{Vk}\} \forall k \in \{0, 1 \sim n_{shade}\} \quad (a)$$

In relation (a), k denotes shading type number, and each shading type number may correspond to different shading degree. When there is no shading condition, the shading type number may be k=0. When there is one shading condition, the shading type number may be $1 \leq k \leq n_{shade}$. Additionally, a shading ratio $\lambda_k$ of each shading condition may be obtained from the ratio of the measured irradiation intensity W to the standard radiation intensity W' of the photovoltaic module array 20 under standard test conditions. In general, the standard test conditions may include an irradiation intensity of 1000 W/m²; AM 1.5G; and a temperature of 25° C.

The present disclosure may take the photovoltaic module array 20 comprising the photovoltaic modules in series connection for example. Then, the output voltage $V'_{pv}$ of the photovoltaic module array 20 may be the sum of all output voltages $V_{pv}$ of the photovoltaic modules of the photovoltaic module array 20. Moreover, it is assumed that the voltage coefficients $m'_{Vk}$ (second voltage coefficient) and the current coefficients $m'_{Ik}$ (second current coefficient) corresponding to several local maximum power points of the photovoltaic module array 20, such as the maximum power point A and the maximum power point B, are function of the voltage coefficient $m_{Vk}$ and the current coefficient $m_{Ik}$ of one photovoltaic module of the photovoltaic module array 20 under no shading condition, especially proportionally with different shading ratios $\lambda_k$ as following functions (b) and (c):

$$m'_{Vk} = \begin{cases} \frac{m_{Vk} \times (N - n_{shade})}{N}, k = 0 \\ \frac{m_{VK} + \left\{[N - n_{shade} + (k-1)] \times \left[1 - \left(1 - \lambda_k \frac{(1 - m_{Vk})}{m_{Ik}}\right)\right]\right\}}{N}, 1 \leq k \leq n_{shade} \end{cases} \quad (b)$$

$$m'_{Ik} = \begin{cases} m_{Ik}, k = 0 \\ (1 - \lambda_k) m_{Ik}, 1 \leq k \leq n_{shade} \end{cases} \quad (c)$$

As one of ordinary skill in the art having the benefit of the present disclosure would appreciate, the above-mentioned assumptions may be obtained by an empirical rule or simulation verification. These assumptions may be programmed into the micro control unit 243. The micro control unit 243 may estimate the voltage coefficients $m'_{Vk}$ of several local maximum power points according to the voltage coefficient $m_{Vk}$ and the current coefficient $m_{Ik}$ of one photovoltaic module of the photovoltaic module array 20 under no shading condition, and the shading ratios $\lambda_k$. Further, the micro control unit 243 may estimate several local maximum power point powers $P'_{max}$ of the photovoltaic module array 20 according to corresponding voltage coefficients $m'_{Vk}$ of several local maximum power points, in which the micro control unit 243 estimates them based on Equation (d):

$$P'_{max} = m'_{Ik} I_{sc} \times m'_{Vk} N V_{oc} \quad (d)$$

The micro control unit 243 may determine the whole maximum power point of the photovoltaic module array 20 according to the maximum ($P_{max}$) of the several local maximum power point powers $P'_{max}$ (first maximum power point powers), such as the maximum power point A or the maximum power point B, and corresponding shading type number k by comparing the several local maximum power point powers $P'_{max}$ with one another. In other words, the micro control unit 243 may take the power point corresponding to the maximum power point power of the several local maximum power point power as the whole maximum power point of the photovoltaic module array 20. The micro control unit 243 may estimate the voltage coefficient $m'_{Vk}$ by entering the shading type number k, the voltage coefficients $m_{Vk}$, and the current coefficients $m_{Ik}$ corresponding to the whole maximum power point into Equation (b) to obtain the whole voltage coefficient $m_{mp} = m'_{Vk}$ of the whole maximum power point.

The micro control unit 243 may obtain the whole estimated voltage $V'_{mp}$ of the whole maximum power point of the photovoltaic module array 20 according to the whole voltage coefficient $m_{mp}$ through Equation: $V'_{mp} = N \times m_{mp} \times V'_{oc}$. Further, the micro control unit 243 may control power converter 22 to adjust the operation voltage of the photovoltaic module array 20 according to the whole estimated voltage $V'_{mp}$, such that the photovoltaic module array 20 may generate the maximum power point power $P_{max}$ (second maximum power point power) and supply power to the power supply network 26 through the power converter 22.

Some embodiments of the present disclosure provide for photovoltaic modules connected in series. One of ordinary skill in the art having the benefit of the present disclosure would appreciate other arrangements for implementing example embodiments without departing from the spirit or scope of the present disclosure. For example, one of ordinary skill in the art having the benefit of the present disclosure would appreciate that the photovoltaic modules may be arranged in parallel.

Although the error of the maximum power point power $P_{max}$ of the photovoltaic module array 20 obtained by the above-mentioned method is very small or non-existent, the present embodiment may be improved by a perturbation and observation (P&O) method to obtain more exact maximum power point power $P_{max}$.

In some embodiments, the micro control unit 243 may estimate the tangent slope of the point corresponding to the whole estimated voltage $V'_{mp}$ on the output voltage-power characteristic curve obtained from the parameter detecting unit 241. If the tangent slope is larger than zero, the micro unit 243 may control the power converter 22 to provide a first perturbation voltage to the output end of the photovoltaic module array 20, such that the output voltage of the photovoltaic module array 20 increases. If the tangent slope is less than zero, the micro unit 243 may control the power converter 22 to provide a second perturbation voltage to the output end of the photovoltaic module array 20, such that the output voltage of the photovoltaic module array 20 decreases.

Figure 2C:
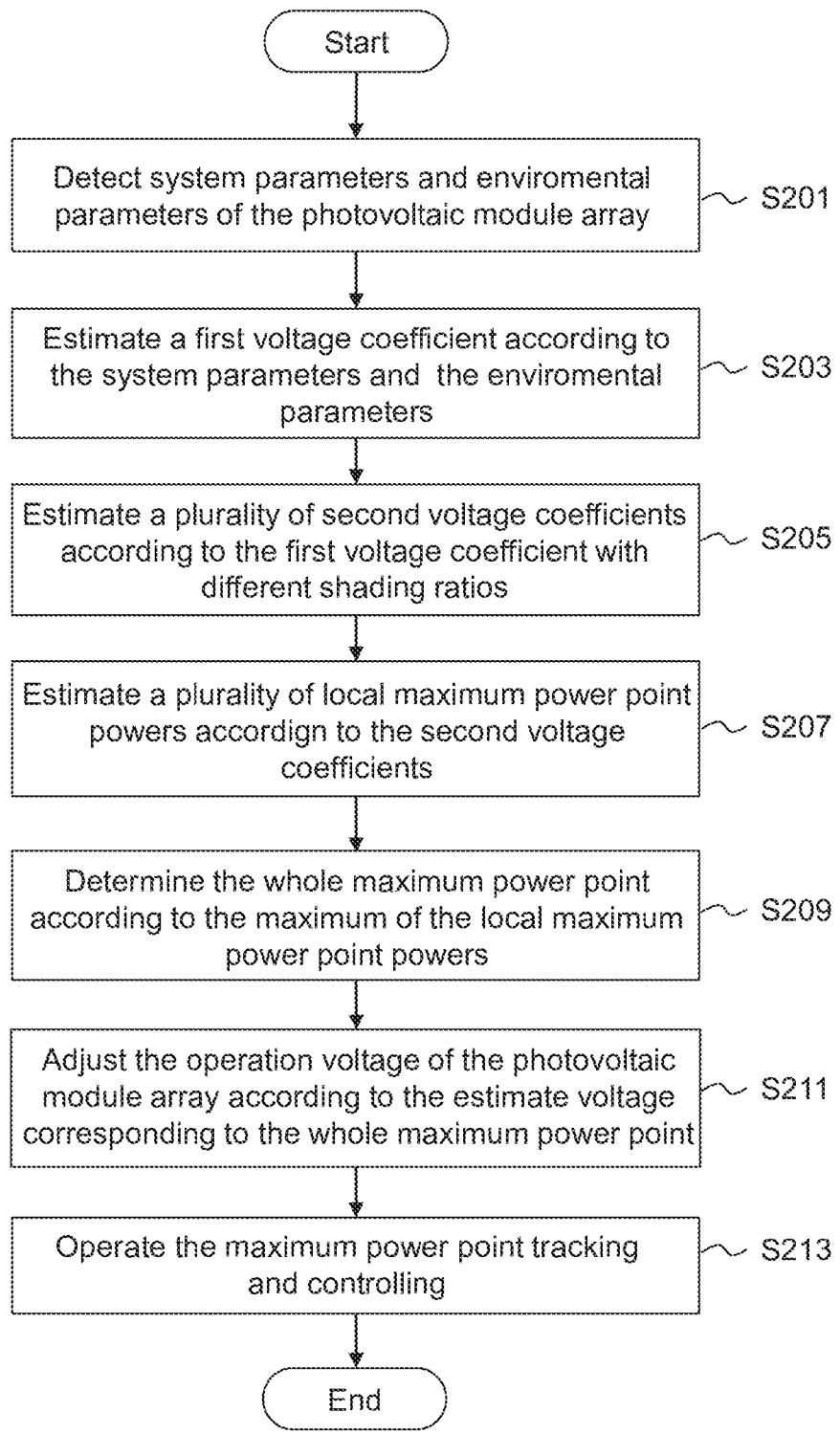
FIG. 2C illustrates a flow chart of a method of multipoint direct-prediction for maximum power point tracking of a photovoltaic module system in accordance with one embodiment of the present disclosure.

Reference is now made to FIG. 2C in conjunction with FIGS. 2A and 2B. FIG. 2C is a flow chart illustrating a method of multipoint direct-prediction for maximum power point tracking of a photovoltaic module system in accordance with one embodiment of the present disclosure. Generally, the steps of the method of multipoint direct-prediction for maximum power point tracking of a photovoltaic module system 2 include:

First, at action S201, the parameter detecting unit 241 of the control device 24 may detect the system parameters and the environmental parameters of the photovoltaic module array 20, in which the system parameters include, for example but not limited to, number of the photovoltaic modules N, an open-circuit voltage $V'_{oc}$ of the photovoltaic module array 20, a conservation efficiency $\eta'$, an effective line power $P'_s$, and a series resistance $R'_s$, and the environmental parameters include, for example but not limited to, an environmental temperature T, an illustration intensity W, and number of the shading $n_{shade}$.

Second, at action S203, the micro control unit 243 of the control device 24 may estimate the voltage coefficient $m_{Vk}$ (first voltage coefficient) and the current coefficient $m_{Ik}$ of one photovoltaic module under no shading condition by applying Equation (15) to the above-mentioned parameters.

Third, at action S205, the micro control unit 243 may estimate the voltage coefficients $m'_{Vk}$ (second voltage coefficient) and the current coefficients $m'_{Ik}$ (second current coefficient) of several local maximum power points according to the voltage coefficient $m_{Vk}$, the current coefficient $m_{Ik}$, and the shading ratio $\lambda_k$ of each shading condition of one photovoltaic module under no shading condition through Equations (b) and (c).

Fourth, at action S207, the micro control unit 243 may estimate several maximum power point powers $P'_{max}$ corresponding to the voltage coefficients $m'_{Vk}$ and the current coefficients $m'_{Ik}$ of several local maximum power points through Equation (d).

Fifth, at action S209, the micro control unit 243 may determine the whole maximum power point of the photovoltaic module array 20 according to the maximum ($P_{max}$) of the several local maximum power point powers $P'_{max}$, and corresponding shading type number k by comparing the several local maximum power point powers $P'_{max}$ with one another.

Sixth, at action S211, the micro control unit 243 may estimate the voltage coefficients $m'_{Vk}$ according to the shading type number k, the voltage coefficient $m_{Vk}$, and the current coefficient $m_{Ik}$ corresponding to the whole maximum power point through Equation (b) to obtain the whole voltage coefficient $m_{mp}=m'_{Vk}$ (third voltage coefficient) of the whole maximum power point. Further, the micro control unit 243 may estimate the whole estimated voltage $V'_{mp}$ of the whole maximum power point of the photovoltaic module array 20 according to the whole voltage coefficient $m_{mp}$ through Equation: $V'_{mp}=N\times m_{mp}\times V'_{oc}$. Also, the micro control unit 243 controls power converter 22 to adjust the operation voltage of the photovoltaic module array 20 according to the whole estimated voltage $V'_{mp}$.

Finally, at action S213, the micro control unit 243 may operate a tracking and controlling process of the maximum power point. For example, the micro control unit 243 may operate a perturbation and observation (P&O) method to obtain more exact maximum power point power $P_{max}$.

Accordingly, the present disclosure may advantageously provide for a photovoltaic module system and a method of maximum power point prediction for a photovoltaic module system under partially shaded conditions using system parameters and environmental parameters of one photovoltaic module of the photovoltaic module array to estimate the parameters of the photovoltaic module system and obtain the maximum power point thereof exactly.

Realizations in accordance with the present disclosure have been described in the context of particular embodiments. These embodiments are meant to be illustrative and not limiting. Many variations, modifications, additions, and to improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the disclosure as defined in the claims that follow.

What is claimed is:

1. A method of maximum power point tracking for a photovoltaic module system, wherein the photovoltaic module system comprises a photovoltaic module array comprising a plurality of identical photovoltaic modules, and the tracking method comprises:
   detecting system parameters and environmental parameters of the photovoltaic module array;
   estimating a first voltage coefficient of one photovoltaic module according to the system parameters and the environmental parameters;
   estimating a plurality of second voltage coefficients of the photovoltaic module array according to the first voltage coefficient with different shading ratios;
   estimating a plurality of local maximum power point powers according to corresponding second voltage coefficients; and
   determining a whole maximum power point by comparing the local maximum power point powers with one another.

2. The method according to claim 1, wherein the system parameters comprises the photovoltaic module array, an open-circuit voltage of the photovoltaic module array, a conservation efficiency, an effective line power, and a series resistance.

3. The method according to claim 2, wherein the conservation efficiency is a ratio of the effective line power of the photovoltaic module array to a direct current output power of the photovoltaic module array.

4. The method according to claim 2, wherein the first voltage coefficient is a ratio of the an output voltage of one photovoltaic module to an open-circuit voltage of the photovoltaic module.

5. The method according to claim 2, wherein the environmental parameters comprise an environmental temperature, an illustration intensity, and a number of the shading.

6. The method according to claim 5, wherein estimating the first voltage coefficient of one photovoltaic module according to the system parameters and the environmental parameters comprises estimating the shading ratios according to the illustration intensity.

7. The method according to claim 6, wherein the method further comprises estimating a first current coefficient according to the system parameters and the environmental parameters.

8. The method according to claim 7, wherein the second voltage coefficients are functions of the first voltage coefficient and the first current coefficient.

9. The method according to claim 7, when the first voltage coefficient is $m_{Vk}$, the first current coefficient is $m_{Ik}$, the second voltage coefficients are $m'_{Vk}$, the number of the photovoltaic module is N, the shading ratios are $\lambda_k$, wherein k denotes a shading type number, and the shading number is $n_{shade}$, the relation of the second voltage coefficients are $m'_{Vk}$, the first voltage coefficient is $m_{Vk}$, and first current coefficients $m_{Ik}$ are as follows:

$$m'_{Vk} = \begin{cases} \dfrac{m_{Vk} \times (N - n_{shade})}{N}, k = 0 \\ \dfrac{m_{VK} + \left\{ \dfrac{[N - n_{shade} + (k-1)] \times}{\left[1 - \left(1 - \lambda_k \dfrac{(1-m_k)}{m_{Ik}}\right)\right]} \right\}}{N}, 1 \le k \le n_{shade} \end{cases}$$

10. The method according to claim 1, wherein the method further comprises adjusting an operation voltage of the photovoltaic module array according to a whole estimated voltage corresponding to the whole maximum power point.

11. The method according to claim 10, wherein adjusting the operation voltage of the photovoltaic module array comprises:
obtaining a third voltage coefficient corresponding to the maximum power point among the second voltage coefficients; and
estimating the whole estimated voltage corresponding to the whole maximum power point of the photovoltaic module array according to the third voltage coefficient.

12. The method according to claim 10, wherein the method further comprises operating a maximum power point tracking and controlling after adjusting the operation voltage of the photovoltaic module array.

13. The method according to claim 12, wherein operating the maximum power point tracking and controlling comprises adopting a perturbation and observation method.

14. A control device for predicting the maximum power point of a photovoltaic module array, wherein the photovoltaic module array comprises a plurality of identical photovoltaic modules, the control device is connected between the photovoltaic module array and a power converter, and the control device comprises:
a parameter detecting unit, connecting to the photovoltaic module array and configured to detect system parameters and environmental parameters of the photovoltaic module array; and
a micro control unit, connecting between the parameter detecting unit and the power converter, and configured to estimate a first voltage coefficient of one photovoltaic module according to the system parameters and the environmental parameters, estimate a plurality of second voltage coefficients of the photovoltaic module array according to the first voltage coefficient with different shading ratios, estimate a plurality of local maximum power point powers according to corresponding second voltage coefficients; and determine a whole maximum power point by comparing the local maximum power point powers with one another.

15. The control device according to claim 14, wherein the system parameters comprise a number of the photovoltaic modules, an open-circuit voltage of the photovoltaic module array, a conservation efficiency, an effective line power, and a series resistance.

16. The control device according to claim 15, wherein the conservation efficiency is a ratio of the effective line power of the photovoltaic module array to a direct current output power of the photovoltaic module array.

17. The control device according to claim 15, wherein the first voltage coefficient is a ratio of the an output voltage of one photovoltaic module to an open-circuit voltage of the photovoltaic module.

18. The control device according to claim 15, wherein the environmental parameters comprise an environmental temperature, an illustration intensity, and a number of the shading.

19. The control device according to claim 18, wherein the micro control unit estimates the shading ratios according to the illustration intensity.

20. The control device according to claim 19, wherein the micro control unit estimates a first current coefficient according to the system parameters and the environmental parameters.

21. The control device according to claim 20, wherein the second voltage coefficients are functions of the first voltage coefficient and the first current coefficient.

22. The control device according to claim 20, when the first voltage coefficient is $m_{Vk}$, the first current coefficient is $m_{Ik}$, the second voltage coefficients are $m'_{Vk}$, the number of the photovoltaic module is N, the shading ratios are $\lambda_k$, wherein k denotes a shading type number, and the shading number is $n_{shade}$, the relation of the second voltage coefficients are $m'_{Vk}$, the first voltage coefficient is $m_{Vk}$, and first current coefficients $m_{Ik}$ are as follows:

$$m'_{Vk} = \begin{cases} \dfrac{m_{Vk} \times (N - n_{shade})}{N}, k = 0 \\ \dfrac{m_{Vk} + \left\{ \dfrac{[N - n_{shade} + (k-1)] \times}{\left[1 - \left(1 - \lambda_k \dfrac{(1-m_{Vk})}{m_{Ik}}\right)\right]} \right\}}{N}, 1 \le k \le n_{shade} \end{cases}$$

23. The control device according to claim 14, wherein the micro control unit obtains a third voltage coefficient corresponding to the maximum power point among the second voltage coefficients, estimates a whole estimated voltage corresponding to the whole maximum power point of the photovoltaic module array according to the third voltage coefficient, and adjusts an operation voltage of the photovoltaic module array according to the whole estimated voltage corresponding to the whole maximum power point.

24. The control device according to claim 23, wherein the micro control unit adopts a perturbation and observation method to adjust the operation voltage of the photovoltaic module array.

* * * * *